United States Patent [19]

Crossman

[11] 3,727,203

[45] Apr. 10, 1973

[54] ADDRESS COMPARATOR WITH TIME INTERVAL MATCHING TRANSPORT CHARACTERISTICS

[76] Inventor: Edward R. F. W. Crossman, 2935 Elmwood Court, Berkeley, Calif. 94705

[22] Filed: Mar. 1, 1972

[21] Appl. No.: 230,914

[52] U.S. Cl. ....................340/174.1 J

[51] Int. Cl. ....................G11b 27/10

[58] Field of Search ....................340/174.1 C, 174.1 J, 340/174.1 A

[56] References Cited

UNITED STATES PATENTS

| | | | |
|---|---|---|---|
| 3,621,152 | 11/1971 | Billings | 340/174.1 J |
| 3,631,421 | 12/1971 | Perkins | 340/174.1 J |

*Primary Examiner*—Vincent P. Canney
*Attorney*—Manfred M. Warren et al.

[57] ABSTRACT

An information storage and retrieval apparatus and method are disclosed in which apparatus is provided to move the relative positions of a storage medium, such as a magnetic tape, and reading means from a current address to a desired or target address. The apparatus includes a comparator means for comparing the current address to a given target address and generating an error signal, and additionally includes generator means formed to respond to the error signal and select one of a plurality of time intervals during which the medium and reading means are sequentially repositioned with respect to each other. The time intervals are precalibrated to match the transporting characteristics of the apparatus repositioning the medium and reading means and each time interval may be elicited by a range of errors of differing magnitude. The apparatus iteratively reads the current address, transports for a precalibrated time interval, reads a second address and transports again until the current address read is substantially equal to the target address, at which time the medium can be advanced to the target address and storage or retrieval of data accomplished. The apparatus preferably includes a tape recorder having a slow forward reading speed and fast forward and reverse tape repositioning speeds. The precalibrated time intervals are matched to the incremental number of addresses normally traversed by the tape transport during a start-up, continued motion and braking of the tape transport. The apparatus and method preferably include precalibrated jump times based upon the logarithm of the error between the target and current addresses. Additionally, a stored datum initially representing the positional error can be decremented at a variable rate in order to reduce the number of iterations necessary to reach the target address. Tape transport motion sensing apparatus and address signal verification means are also disclosed.

20 Claims, 4 Drawing Figures

ADDRESS COMPARATOR WITH TIME INTERVAL MATCHING TRANSPORT CHARACTERISTICS

BACKGROUND OF THE INVENTION

Undoubtedly one of the more critical aspects of an information storage and retrieval system is the manner in which access to information, or the position for storing of the information, in the storage medium is accomplished. It has become common practice in the industry to provide the area in which the information is stored or will be stored with an "address" for retrieval of that information or access to that area. The precise manner of access has varied somewhat in accordance with the hardware employed, for example, magnetic tapes, discs or drums or paper tapes, but certain approaches are commonly employed in connection with a variety of hardware.

Undoubtedly the most basic aspect of a data accessing system is to provide "address" signals in the storage media which indicate the beginning and/or end of information recorded in the media. The techniques employed may be illustrated by reference to magnetic tape information storage and retrieval systems. One of the most common approaches to store and retrieve digital data is to have the data written sequentially along the tape with constant spacing with the user being responsible for identifying data blocks by the use of "beginning-of-tape," "end-of-record" and "end-of-file" signals. Such tapes typically have seven tracks in parallel, with all tracks containing data and no single track acting as an address track. These systems employ hardware (rather than a program) to detect the beginning-of-tape, end-of-record, and end-of-file signals (which act as address signals) while searching at a single forward speed starting from the fully re-wound position identified by the beginning-of-tape signal. The user's program will count data blocks identified by end-of-record and end-of-file signals and continue until a specific number have been traversed or a specific pattern of data encountered. Thus, this system, in effect, reads the entire data file at normal reading speed until the desired data is encountered. Access is accomplished by employing a high reading speed coupled with a sophisticated and relatively expensive computer interface and program. While this system is entirely effective and highly advantageous for certain application, it can be relatively costly in terms of initial investment.

Another type of accessing system for digital data information and retrieval apparatus is one which includes a "fixed address" system. In a fixed address system a signal is recorded periodically at arbitrary lengths along a timing track, which is usually a separate track from the data tracks, although it is in indexed relation thereto. Searching is performed at a single high speed (for example, about 80 inches per second), and the reading or pick-up apparatus counts timing marks on the timing track and keep track of the same so as to move to the timing mark which is indexed to the desired data. Digital addresses may also be included in the data channels to verify location. Typical of such systems are U.S. Pat. Nos. 2,683,568 and 3,541,271. Again, the retrieval apparatus in effect reads or samples all of the contents of the tape at a single high reading speed and employs a counter mechanism to control actuation of the tape transport mechanism. The counting circuitry causes the tape transport to advance the tape in the appropriate direction until parity is reached between the desired or "target" address and the current address, as counted by the counting circuit and/or ascertained by digital comparison of desired and actual addresses. This type of system similarly requires a high speed reading capability and further a high speed counting capability. Additionally, the address signal must be substantial in length in order to enable high speed counting and accordingly use a significant portion of the storage capacity of the tape.

Another form of fixed address access system employs a tape mounted in a cassette having supply and take-up reels. One of the reels is geared to an optical interrupting disc or toothed sector wheel which cooperates with a photoelectric sensor to count the number of impulses per revolution of the spindle of the reel. Binary-coded addresses are written on one of the two tracks of the tape with data recorded in indexed relation thereto on a remaining track. Searching is performed by reading the current address on the tape at relatively slow speeds and comparing the same to a target address to determine the error or number of addresses to be skipped in order to reach the target address. The tape transport is then put into fast forward or fast reverse (120 inches per second), and the program begins to count the number of pulses from the optical interrupting disc corresponding to the number of addresses which must be skipped. When a few less than the correct number of addresses have been received, the transport is put into slow forward speed (5 inches per second) and sequential addresses are read until the desired address appears.

This accessing system relies primarily upon prior positional calibration, that is, agreement between the sector wheel and address signal spacing on the tape to arrive near a desired point in a single jump. While highly satisfactory for many applications, maintenance of the positional calibration requires precision and relatively expensive equipment. Moreover, ambient environmental conditions can cause a change in calibration, and the cost of positional calibration would be high when employed with a full-sized reel-to-reel system having 3,000 to 4,000 feet of tape, rather than a cassette having 200 feet of tape. Additionally, in order to use a positional calibration system, substantial mechanical modifications of a standard deck transport system must be made.

When recording and reproducing audio or video analog (rather than digital) material, such as speech, music, and elements of a scanned video frame, it is desirable to employ as low a reading speed as the bandwidth of the material will allow, in order to conserve tape, while still obtaining rapid access to desired starting points for cueing and related purposes. Tape transport mechanisms for the first of these purposes have reached a high degree of sophistication in the state of the art, but little progress has been made in the second, namely rapid access.

Accordingly, it is an object of the present invention to provide a data storage and retrieval apparatus and method which affords access to areas on a storage medium for the retrieval or storage of analog or digital data which is relatively simple and inexpensive to construct and can be integrated into standard equipment for information storage and retrieval.

It is another object of the present invention to provide a controller for a tape recorder which can be added to the tape recorder without mechanical modification thereof and used to access information stored on a tape transported by the tape recorder which is more durable and less subject to influence from the ambient environment.

It is another object of the present invention to provide a data storage and retrieval apparatus in which the cost of the access system is reduced and yet the time required to retrieve data is minimized.

Other objects, features, and advantages of the data storage and retrieval apparatus and method of the present invention will become apparent upon consideration of the drawings and the following description of the preferred embodiment.

SUMMARY OF THE INVENTION

The data storage and retrieval apparatus of the present invention includes a data storage medium formed with a multiplicity of storage areas having address signals, reading and comparator means formed to read the address signals and compare the same against a target address and generate an error signal proportional to the difference therebetween, and transport means connected to the reading and comparator means and the medium for relative sequential positioning thereof. The improvement of the present invention is comprised, briefly, of a time interval generator means connected to the reading and comparator means for receipt of error signals and connected to the transport means for transmission of control signals thereto to control actuation of the transport means. The generator means is responsive to error signals falling within a first range of error signals to generate a first control signal starting the transport means and stopping the same after a first time interval. The generator means is further responsive to error signals falling outside the first range of error signals and within at least one additional range of error signals to generate an additional control signal starting and stopping the transport means after a time interval differing in length from the first time interval, and each time interval defined by the control signals is precalibrated to be about equal in length to the length of time required to move the medium through an incremental number of addresses equal to the magnitude of one of the error signals falling within the range of error signals to which each time interval corresponds.

In a narrower aspect of the present invention the time interval generator means is used to control a standard tape recorder having a slow forward reading mode and fast forward and reverse transport modes. Additionally, the reading and comparator means is preferably formed to generate an error signal having a magnitude determined by the logarithm, preferably to the base 2, of the error between the current address signal and the target address and each precalibrated time interval is elicited by a range of error signals defined by the integer part of the logarithm of the error, with the reading and comparator means and the generator means being formed to repeat the read-transport-read sequence until the current address signal is equal to the target address. Decrementing means are preferably provided to sequentially reduce a stored datum initially equal to the error through a plurality of steps to zero at differing or constant decrementing rates in order to more closely match the precalibrated time intervals to the characteristics of the tape transport.

DESCRIPTION OF THE PREFERRED EMBODIMENT

Figure 1:
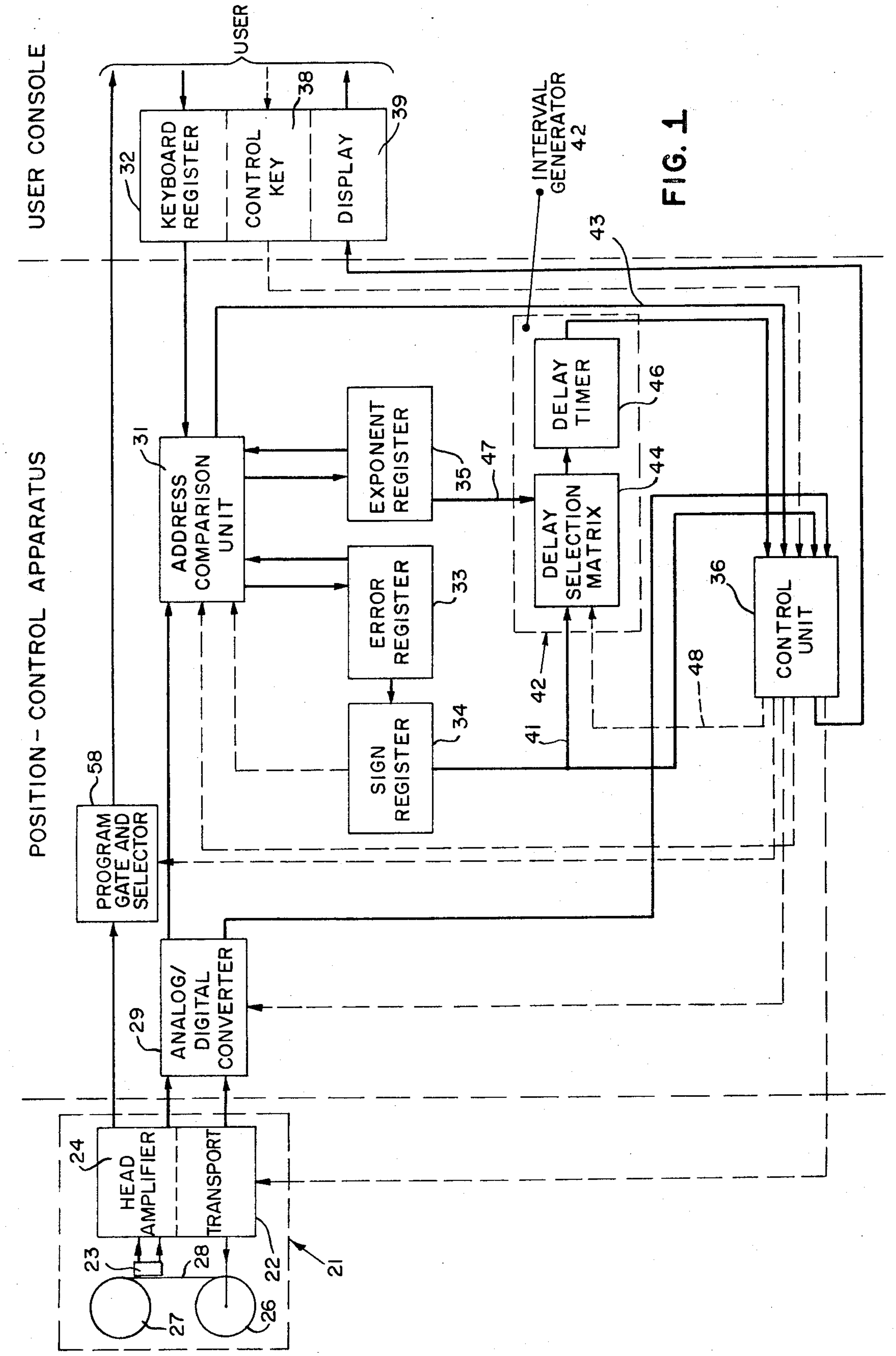
FIG. 1 is a schematic representation of a data storage and retrieval apparatus constructed in accordance with the present invention.

In its broadest aspect the apparatus and method of the present invention can be advantageously employed in connection with a variety of different types of data storage and retrieval systems. The apparatus and method of the present invention, however, is particularly well suited for use with conventional tape recorders and magnetic tapes to result in a highly effective random access system which can be relatively inexpensively constructed and used. Thus, as shown in FIG. 1, the apparatus of the present invention is illustrated as used with a conventional or standard tape deck, generally designated 21, and having a transport means 22 and reading means or pick-up head 23 and amplifier 24 therefor. Mounted on spools or reels 26 and 27 is a magnetic tape 28 which provides a multiplicity of storage areas over the length thereof for the storage of data and address signals. As thus far described, the tape recorder and tape are conventional and readily available apparatus. For example, a model TC-650 stereophonic tape deck produced by Sony may readily be employed as tape recorder 21 in the apparatus of the present invention. Similarly, a Sony model TC-854-4, a four track (quadraphonic) tape recorder, can be used in connection with the apparatus of the present invention. Tape deck 21 should include transport means 22 having a slow speed mode for reading or playing and for recording, a high speed travel mode in forward and reverse or rewind directions, and a stop mode, all of which are conventionally available in tape recorders of the type above referenced. Thus, the transport means 22 can sequentially advance the storage medium or tape 28 past the reading means 23 over the multiplicity of storage areas contained on tape 28. The rate at which the tape is advanced in the slow speed mode for reading or recording typically varies between about 1 inch per second to about 16 inches per second, and at the slower rate as much as twelve hours of material may be recorded on a single track of tape 28 for playback. In the fast-forward or fast-reverse modes of operation, the tape typically moves at a rate of about 80–150 inches per second. As will be set forth in more detail hereinafter, the fast-forward and fast-rewind speeds need not be at any particular rate, although the transport means 22 should produce a substantially reproducible pattern of movement of the tape at fast speed. The access system of the present invention, however, is typically designed so that the tape recorder tape transport need not be extremely accurate in its movement of the tape. Accordingly, the term "substantially reproducible pattern of movement" as used herein shall mean the degree of reproducibility conventionally available in standard tape decks of the type above referred to.

Magnetic tape 28 suitable for use in the apparatus of the present invention can similarly be any one a number of different configurations which are readily commercially available. It is preferable that a multiple track tape be employed with one track having address signals recorded thereon and the other track or tracks having program data. The address signals may be recorded on the address track in a number of different manners, although it has been found that with the system of the present invention it is preferable to record addresses in an analog manner as bit-sequential binary numbers. Unlike counting-type access system in which an "address" may merely be a pulse which is counted and added and subtracted from a starting point, the addresses of the present invention are prerecorded on the tape in a manner so that the point on the tape passing the reading head can be determined by reading any given address. Thus, a sequence of binary digits (typically 15 in number) may be used as an address, and the addresses may be spaced at uniform intervals along the tape to provide a fixed addressing system. Other digital data may be interleaved with addresses on this same track, addresses being distinguished from interleaved program data by a one-bit prefix, making 16 binary digits in all. A typical arrangement employs two addresses per second, with each address being repeated once. Thus, signal spacing is four per second, and on commencing of playback at an arbitrary point, an address will be found within 0.25 seconds. Using positive binary numbers and the above spacing, $2^{15}$ (i.e., 32,768) distinct positions are addressed and may be selected along the tape within a total program duration of 9.1 hours.

Individual binary digits in the address words may be encoded as biphasic magnetic impulses with the direction of initial departure from de-magnetization indicating the value of the binary digit, that is, 0 or 1. Since the addresses are recorded in analog form, playing head 23 and amplifier 24 may be conveniently connected to an analog to digital converter 29 so that the analog address signals can be converted to a digital form for more convenient use.

The program material recorded on the tape may take several forms. For example, the program may include an audio track, video track, and digital track for use in commanding other apparatus such as high speed typewriters and the like, and one or more of these programs may be played from different tracks at the same time. One example of a typical end use of the apparatus of the present invention is in connection with interviewing systems in teaching machines and the like requiring random access to reproduce branching instructional program material. Another example is in a simple data retrieval system in which the user can selectively retrieve audio information. In connection with job counseling it is possible to record for audio playback 9 hours of job descriptions on one track of tape 28 with the address of the commencement of each job description being noted in an index. The user can then refer to an index and seek access to any one of the 2 to 5 minute descriptions recorded on the nine hours of tape. Similarly, the index may include subheadings in which detailed verbal information, such as sources from which further job information can be obtained, are recorded. Thus, the user can elect to play an entire job description or merely retrieve certain names, postal addresses or other indexed information. By employing the address track to store interleaved typewriter text data in addition to addresses, the user may also obtain hard-copy typescript versions of desired information.

In job counseling applications of the type above-described, access to the information for playback by the user need not be accomplished at extremely high speeds, such as are common in digital computers. Accordingly, the user can easily tolerate an access or search time of a minute or even several minutes if the capability to achieve random access to a large store of information can be economically achieved. It is well within the capability of sophisticated computers to retrieve and playback such information almost instantaneously through the use of very expensive magnetic core and drum memory hardware coupled with digital to analog converters. It is a very important feature of the apparatus of the present invention to provide a relatively low cost system of controlling a tape recorder so as to afford random access to program data in a relatively short time period, although the time required to access selected data is greater than that required in complex and expensive accessing systems.

In order to achieve the goal of retrieving stored data by means of a relatively economical controller, an iterative searching method based upon precalibrated time intervals matched to the characteristics of the tape transport is employed. The control apparatus used to retrieve data from the tape recorder and tape, is comprised of comparator means and a time interval generator means. As used herein, the comparator means shall include address comparator unit 31 having a keyboard register 32 by which the user selects target addresses, error register 33, sign register 34, and exponent register 35. Additionally, the analog to digital converter 29 may be considered part of the comparator means since it converts address signals read by reading means 23 and 24 to a form usable by the address comparison unit 33. Still further, control unit 36 contains logic circuitry which is responsive to output from the address comparison unit and can be considered a portion of the comparator means. Thus, the comparator means is formed for receipt of the target address from keyboard register 32 for use in the address comparison unit 31. Address comparison unit 31 is similarly connected to analog to digital converter 29 and reading head 23 and amplifier 24 for receipt of address signals therefrom.

In addition to keyboard register 32, the user is provided with control keys 38 which transmit function-select commands from the user to control unit 36 which has logic circuitry to start independently the functions of the address comparison unit and time interval generator, or of the tape recorder. The user console is further provided with a display 39 connected to control unit 36 to indicate current and target addresses and the current status of operations of the tape recorder as controlled by the control apparatus. The user console may take several different forms, depending upon the degree to which the control apparatus is to be monitored and/or overridden. For example, instead of a thumb wheel, a pushbutton keyboard or other manual input of the target address, keyboard register 32 could be connected for automatic input by a computer or the like. Similarly, the control keys 38 can be provided with the capability for overriding the functions of the control apparatus, and display unit 39 can provide a relatively simple display of the control apparatus functions or a very complex one. User input consoles are well known in the art.

To commence operation, the user selects a target address on keyboard register 32 and pushes a "select" key among control keys 38. Control unit 36 then controls transport 22 to advance tape 28 past reading head 33 in a slow forward speed for reading of address signals. The address signals are amplified by amplifier 24, converted to a digital form by converter 29 and received by address unit 31 along with the target address from keyboard register 32. Address comparison unit 31 includes a data selector, binary adder, exponent extractor and a magnitude comparator, which allows it to compare the address signal received from the reading means with the target signal and to generate an error signal proportional to the difference between the current address signal and the target signal. The error signal is transferred to register 33. Address comparison unit 31 further generates a sign signal which is transferred through the error register to sign register 34. The output of sign and exponent registers 34 and 35 are connected by conductors 41 and 47 to time interval generator means, generally designated 42, and by conductor 43 to control unit 36 to control the forward and reverse directions of tape transport 22, depending upon the sign of the error transmitted to register 34. As will be set forth hereinafter in detail, the data accessing system of the present invention is an iterative system and the comparator means is further formed to terminate searching for the target address when the error signal is substantially zero, with such termination being effected upon receipt of signals through conductor 43 and response to a signal indicating that the error is substantially zero by the logic circuitry contained in control unit 36, which stops the transport and shifts the same to "play" mode.

The use of address comparison units is known within the industry. For example, U.S. Pat. No. 3,541,271 includes an address comparison unit in which parity between a target position and a current address is sought. The combination of the address comparison unit, particularly with exponent generating and iterative functions, and combined with a time interval generator is an important feature of the present invention.

At the heart of the data accessing system of the present invention is time interval generator means 42 which is comprised of a delay selection matrix 44, a delay timer 46, and certain logic circuitry in control unit 36. The time interval generator means is connected to the comparator means, and accordingly the reading means through conductors 41 and 47 and directly through control unit 36 by conductor 48. The generator means is further connected to the transport means 22 through the control unit 36 for transmission of control signals thereto to control actuation of the transport means.

Time interval generator 42 is formed in a manner so that it will control transport 22 to start the same in fast-forward or fast-reverse directions, depending upon the sign register 34, allow the transport to run for a predetermined length of time, stop the transport, and shift the transport into slow-forward speed for reading of a new current address signal. The time interval during which the transport 22 is running in fast mode is selected by the generator means 42 to be about equal in length to the length of time required to move the tape 28 past reading head 23 through an incremental number of addresses about equal to the error determined by the address comparison unit. Since on a 3,000 to 4,000 foot long tape the number of addresses can be quite substantial, for example, $2^{15}$ (i.e., 32,768) time interval generator 42 would have to have an extremely large number of stored or selectable time intervals if the travel time of the transport were to be exactly equal to the error between the target and current addresses as measured by the comparator means. In order to avoid the necessity of providing a capability to store a precalibrated time interval for each magnitude of error, it is an important feature of the present invention that the time interval generator be formed with a relatively discrete and small number, for example, 15 to 30 preset time intervals which are used together with iteration techniques to access data for all magnitudes of errors between the current and target addresses. In a less costly version of the invention this accessing may be accomplished by a generator means formed to respond to error signals falling within a first range of error signals having differing magnitudes to generate a first control signal starting and stopping the transport means after a first time interval. All the error signals between two predetermined magnitudes form a range of error signals and any inner signal within that range will trigger the same predetermined time interval for operation of the tape transport.

In order to minimize the number of repetitions or iterations required, the time interval assigned to a range of error signals is preferably matched to the starting, free-running and braking characteristics of the transport so that the incremental number of addresses advanced is about equal to the magnitude of the average error signal within the range of error signals to which the precalibrated time interval has been assigned.

Therefore, in its broadest aspect, the controller operates by reading the current address, comparing it to a target address, generating an error signal, selecting a precalibrated time interval based upon the error signal, advancing the tape in accordance with the time interval and the sign of the error, reading the new current address, and comparing it to the target address until the error signal is about equal to zero.

Figures 2, 3:
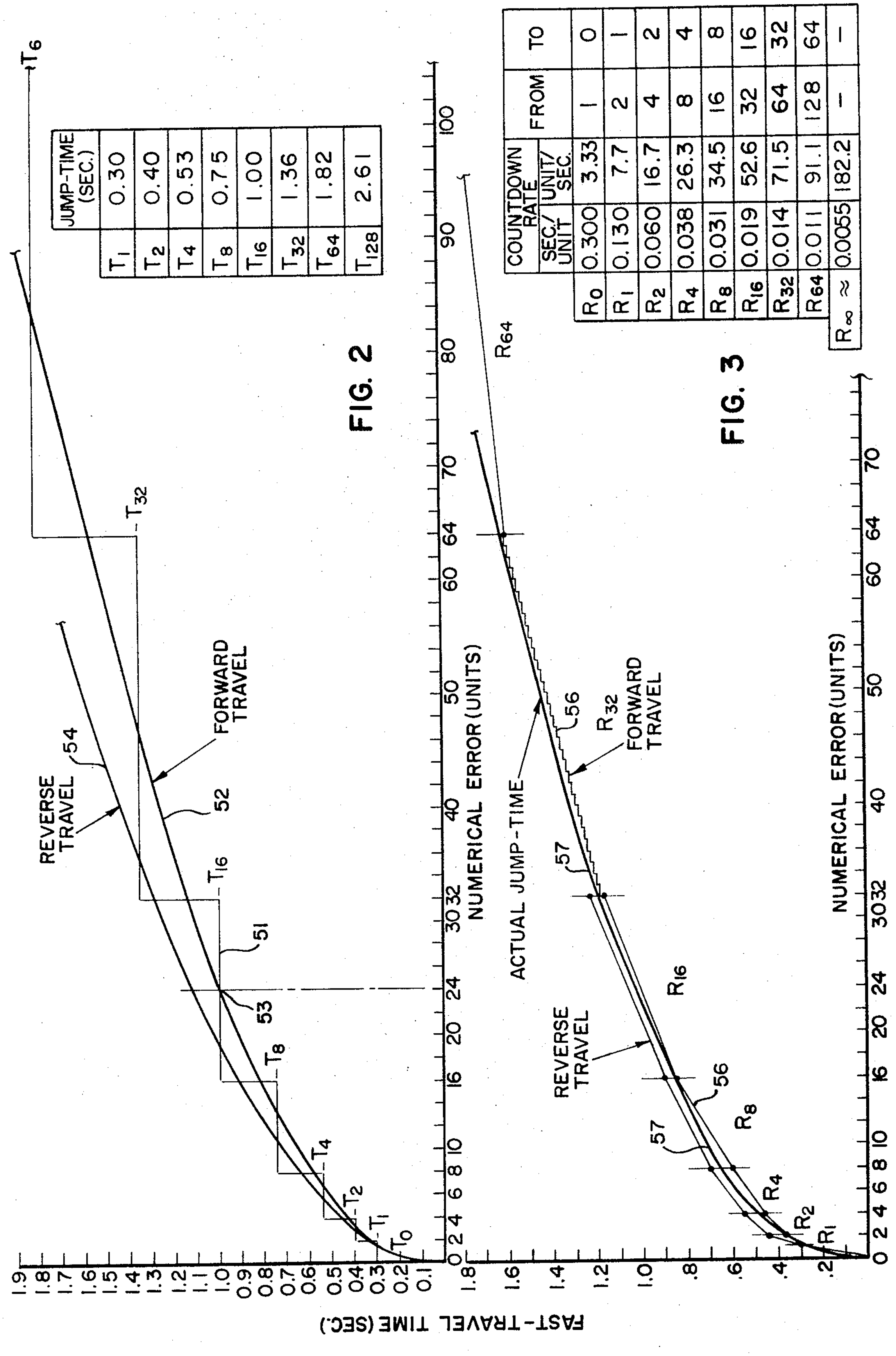
FIGS. 2 and 3 are graphical representations of the relationship between precalibrated time intervals and the error between the current and target addresses, with FIG. 3 illustrating the effect of decrementing the time intervals at a varying count down rate.

Since each time interval must represent a plurality of error signals with differing magnitudes, the advisability of having time intervals which vary from relatively short intervals to relatively long time intervals in order to allow the controller to access data in the minimum number of iterations is highly advantageous. It has been found advantageous, however, and it is an important feature of the present invention to select the ranges of error signals and the corresponding precalibrated time intervals based upon the logarithm of the error between the target and current addresses. The manner in which this is accomplished and its importance in reducing the number of iterations and accordingly the access time for the control of the present invention may best be seen by reference to FIG. 2. In FIG. 2 the tape transport characteristics of transport means 22 for a Sony 650 tape deck is shown with the fast travel time plotted as a function of the incremental number of addresses passed or the numerical error for both forward and reverse travel. The addresses were positioned on the tape at one-half second intervals.

As shown in FIG. 2, the precalibrated time intervals or jump-times have been assigned to error ranges defined by the integer portions of the logarithm to the base 2 of the error between the current and target addresses. Thus, when the comparator means determines that the error between the current and target address is 16, it will also generate an exponent of the error which is stored in register 35. If the base 2 is used, which is preferable since the address signals are recorded on tape 28 in binary code and extraction of logarithms to the base 2 from binary code is very simple, the integer part of the logarithm of an error of 16 to the base 2 has the value 4 with the next higher integer part of the logarithm to the base 2 of an error being 5 for an error of 32. Thus, the jump-time between 16 and 31, as represented by horizontal line 51, is constant and for this tape deck equal to 1 second. For the range of errors from 16 to 31 the logarithm of the error will be 4 and a fraction, and jump-time 51 will be constant at a value of 1 second. The jump-time will be different constant values for errors in which the integer part of the logarithm is 5 or is 3. As will be seen in FIG. 2, time interval 51 crosses the forward travel curve 52 at point 53. This intersection occurs at an error of 24 addresses, which is midway between the range of error signals to which time 51 corresponds. Thus, matching the precalibrated jump-time to the average value of the error in a time range allows the selection of a single precalibrated jump-time for a range of error signals to be a better approximation to the actual time-distance characteristics of the tape transport. It is this approximation, together with inherent variations in the travel of the tape transport, that results in the need for iteration. If, for example, the error is compared and found to be 30 addresses, the time interval generator will generate precalibrated jump-time $T_{16}$ and actuate the transport 22 for 1 second in fast travel mode. Since on the average that will advance the tape 24 addresses, the address reading means will read the new current address and the comparator discover that the new current address is 6 short of the target address. The logarithm of 6 is 2 and a fraction, and accordingly the jump-time generator will advance the tape for a time period determined by $T_4$ covering the range of errors between 4 and 8. Since the average error between 4 and 8 is 6, this second jump should approximately reach the target address.

As will be appreciated, the ranges of error signals to which a given precalibrated time interval is matched become quite large as the logarithm of the error increases. Thus, for large errors the number of iterations or jumps required to move from the current address to the target address will often be greater than two. However, with $2^{15}$ distinct addresses, the binary exponent of the error between the target and current address must lie in the range of 0 to 15, and this will require no more than 15 preset fast travel times. As will be seen in FIG. 2, however, the reverse fast travel time is a separate curve 54 in which an additional time period is required to advance the tape for any given error. This additional time is essentially the result of the fact that most tape decks are conveniently provided only with a forward reading or play mode. Therefore, the tape must be advanced an additional distance in the reverse direction and then played in the forward direction in order to reach the equivalent position that is attained in fast-forward mode. Thus, a second set of 15 preset fast travel times is preferably provided in the time interval generator, making a total of 30 fast travel times for over 32,000 addresses. The use of a logarithmic precalibrated jump-time system and iteration will require a maximum of about 15 addresses to be read and jumps or actuations of the tape transport in order to move from the maximum error between the target and current address to the target address.

In a more costly but more efficient version of the present invention a datum stored in error register 33 and initially equal to the error, is decremented sequentially to zero by repeated computation at precalibrated time intervals. This decrementing means is provided in order that the total time interval generated by the time interval generator operating in conjunction with the decrementing means more accurately approximates the time-distance characteristics of the tape transport. As will be seen in FIG. 3, the time-distance relationship of the tape transport is again plotted, but instead of 15 precalibrated jump-times for the entire range of error signals defined by the integer part of a logarithm, the fast travel period is determined by a stepwise nonlinear function in which the amount of time during which the transport is allowed to run is determined by the initial binary value of the error, with 32,768 possible times. This is accomplished by counting down at rates which vary in accordance with the ranges defined by the exponent of the contents of the error register as they undergo decrementation. As used herein, the term "decrementing"shall include both incrementing and decrementing, with incrementation being applied to negative errors while decrementation is applied to positive errors, and the selection is determined by the contents of sign register 34. Decrementing is accomplished by adding or subtracting one from the contents of error register 33 during each of a series of computation cycles, with the rate of performing such cycles being determined by current contents of the exponent register. Thus, for an error of 30 in error register 33, tape transport would be turned on and error register 33 would be counted down at a rate of 52.6 addresses per second until the contents of the error register reached 16 at which point the countdown rate would drop to 34.5 units per second. This would continue until the contents of the error register reached zero at which point the generator would return a "delay-complete" pulse to control unit 36, which causes tape motion to stop. This decrementing procedure causes the precalibrated time interval, having 32,768 possible values as represented by curve 56, to more closely approximate the actual travel time of the tape transport, as represented by curve 57, which enables reaching of the target address with fewer jumps. As will be seen by reference to FIGS. 2 and 3, the time intervals which would be generated by the generator means become quite small as the logarithm of the initial error increases. In both the relatively less costly and more costly versions it is preferable and a feature of the present invention to form the comparator so that it will merely read in a slow forward motion manner in the event that the comparator means indicates that the error is relatively small at the time of obtaining a fresh address and that the target address can be reached within 1 or 2 seconds by advancing the tape in the forward direction. Control unit 36 may, therefore, be provided with logic circuitry which will control transport 22 to operate in the read mode in the forward direction in the event the sign register and exponent register together indicate that the error is small and in a forward direction. As used herein, therefore, the phrase "-substantially zero" shall mean that the exponent register and sign register have reached the level at which the circuitry in control of 36 will cause the tape transport to remain in slow forward reading mode until the target address is reached. This has typically been selected to be about when the exponent of the error is three or less.

At the end of the iterative searching cycle in either version of the invention, control unit 36 will direct program gate 58 to allow selected analog or digital data to pass through to the user or to an intermediate processor and will simultaneously direct the transport 22 to advance the tape in play mode so that reading head 23 and amplifier 24 may allow the program data to be retrieved at normal speed and pass through program gate 58 to the user. When multiple track tapes are employed control unit 36 must select the desired program track, for playback to the user. The logic circuitry required for the selection and control of the transport and amplifier functions of the tape recorder and program gate 58 are well known in the art.

The time interval generator means of the present invention can be comprised of 10 to 30 preset analog timing devices, such as monostable multivibrators or one-shots. In the embodiment of the present invention which produces the curve of FIG. 2, the magnitude of the initial error exponent causes a selection of one of the one-shots. The selected one shot is triggered and when it returns from an active to an inactive state a pulse is sent to the control unit and the tape transport stopped. An alternative method of providing precalibrated time intervals as shown in FIG. 2 is to form the time interval generator means with a clock, delay cycle counter, precalibrated count termination means, and a comparing circuit. Upon receipt of the exponent of the initial error the comparing circuit selects a precalibrated count termination magnitude and turns on the clock and counter. When the counter reaches the selected count termination magnitude, the comparing circuit stops the tape transport. This second implementation of FIG. 2 is more costly than the first, and, as is set out hereinafter, these elements can be used with minor modification to act as a decrementing means to provide the more accurate approximation in the curve of FIG. 3.

Figure 4:
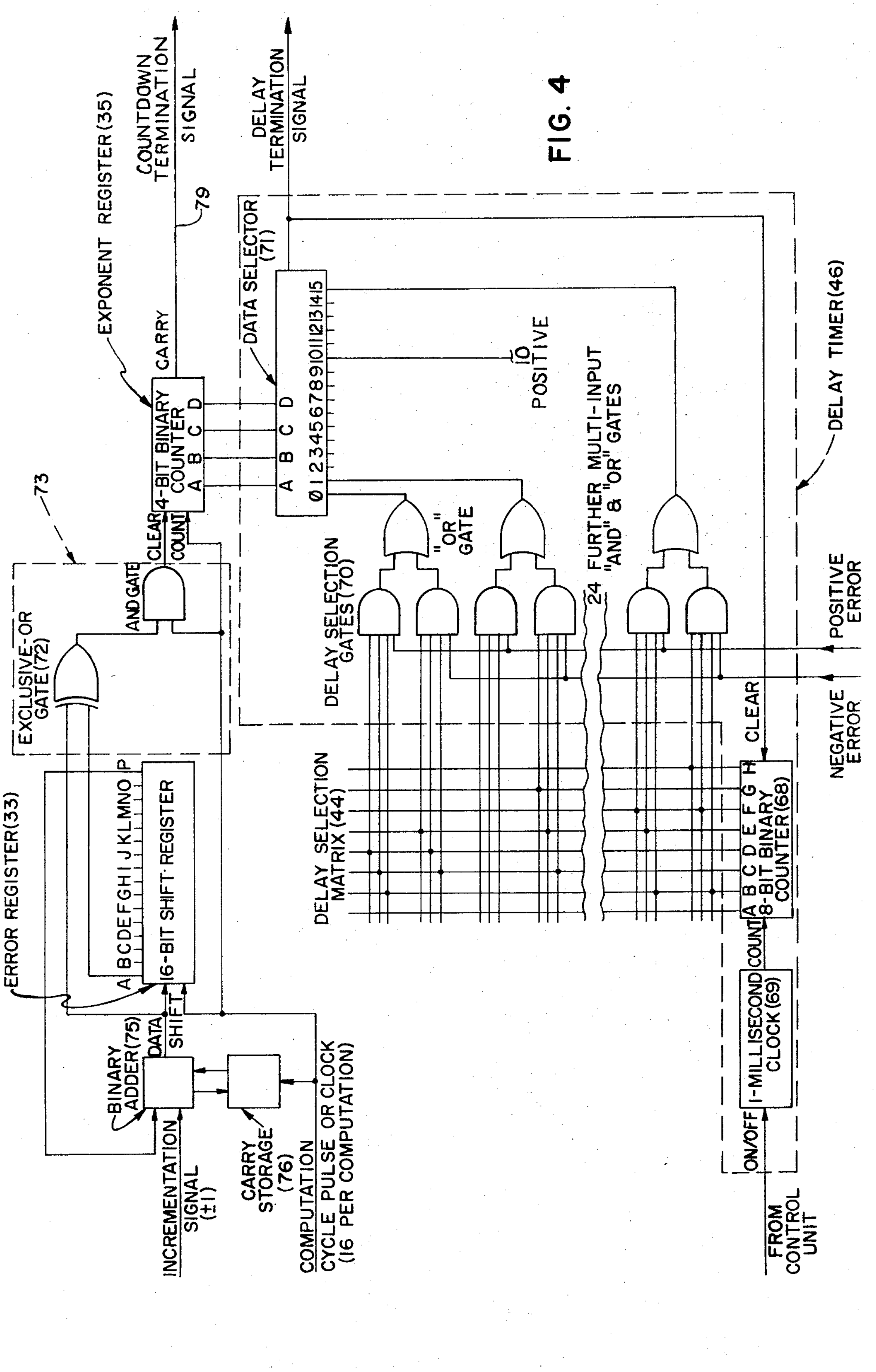
FIG. 4 is a detailed logic flow diagram of an error register, exponent generator and register, delay selection matrix and delay timer constructed in accordance with the present invention.

Implementation of the control apparatus of the present invention including decrementing means may best be understood by reference to FIG. 4. On commencing fast travel in a direction determined by the contents of sign register 34, a delay clock 69 is turned on by the control unit 36. At this time the exponent register 35 contains the integer part of the exponent of the initial error expressed in one's complement binary form. For example, if the actual error is 30 in decimal notation the contents of the error register will be 0,000,000,000,011,110, and its negative exponent will be 10 in decimal notation or 1010 in one's complement binary notation. Outputs of the exponent register 35 will be A=0, B=1, C=0, D=1. This four-line output from the exponent register 35 is decoded by the data selector 71 and selects a certain one of a number of multi-input AND gates 70, in this case the one designated "10 Positive," to determine the delay interval. The eight-binary-digit delay counter 68 is increased at each pulse emitted by the delay clock 69 until a configuration of its outputs agrees with that wired into the delay selection matrix 44 for gate "10 Positive." At this point the data selector 71 is activated and transmits a positive voltage level to the control unit 36 indicating termination of the predetermined delay. This level also clears the delay counter 68 in preparation for a fresh delay cycle. Thus, gates 70 act as a delay cycle termination means. On receipt of the delay termination signal the control unit initiates a decrementation cycle of the address comparison unit resulting in reduction of the positive or negative number or datum, stored in the error register 33, by one unit, in this example to the number 29. Exponent extractor or generator 73 extracts a new exponent for the datum number 29, which in this case does not change the integer part of the logarithm of the datum. The delay cycle is repeated with the "10 Positive" gate being again selected, and the clock and counter activated until the precalibrated count termination magnitude wired into matrix 44 is reached, at which time error register 33 is decremented again. Accordingly, in the example given, when the datum stored in error register 33 after decrementation is 30 through 16, the 10th Positive gate will be activated. When it is 15 through 8, the 11th Positive gate is activated, and when it is 7 through 4, the 12th Positive gate is activated. Similarly, when the error register is 3 or 2, the 13th Positive gate is activated, and when the datum is 1 and 14th Positive gate is activated. Upon reaching zero in the error register, the exponent extractor 73 will cause exponent register to have the value 1111 at which point a countdown termination signal is passed to control unit 36 through conductor 79 and the tape transport stopped and caused to read a new address. This implementation effects a countdown rate of the datum in error register 33 at a varying rate with the exponent of the datum by counting up on binary counter 68 at a constant clock rate for precalibrated varying values, as determined by delay matrix 44.

Decrementation and binary exponent computation are accomplished as follows employing serial binary computation within address comparison unit 31. Sixteen binary digits stored in the error register 33 are shifted one by one into one input of a conventional binary full adder 75 provided with a carry flipflop 76. The other input of the said binary adder is supplied with an input suitable to accomplish incrementation or decrementation as required.

The exponent register 54 is a four-binary-digit counter. This is cleared prior to computation and increased by one following each of the 16 computation cycles. This register is also cleared whenever the output of the binary adder differs from the contents of the left-most binary storage element in the error register. By this means the counter comprising the error exponent register is caused to increment as many times as there are identical pairs of binary digits reading from right to left along the sequence of binary storage elements comprising the error register 33 at the termination of a computation cycle. Should all these be identical (either all zeros or all ones) the exponent counter 35 will count through 15 (i.e., 1111). This condition indicates that the decrementation process has reached zero, and is employed to cause cessation of the decrementation-delay-decrementation cycle as above described.

The iterative precalibrated jump-time system of the present invention does inherently require more searching time than some of the more sophisticated systems. In applications such as interview systems and teaching devices, the search time required to access the program data is well within the time which can be tolerated for switching. In order to further reduce the time required to access data, it is a further feature of the present invention to slightly modify the tape transport logic circuitry. Many standard tape recorders are provided with a fixed delay time on the order of 1½ seconds after the braking signal in order to insure that the tape comes to a complete stop before shifting to play mode. Thus, when moving from fast reverse to slow play forward, there would be very substantial stress on the tape unless reels 26 and 27 are allowed to come to a complete stop. When the control system of the present invention is employed, it is preferable to eliminate the time delay built-in to transport 22 and substitute therefor a transport movement sensing means. The tape transport is normally provided with supply and take-up electric motors, and the sensing means can be connected across the windings of these motors to sense alternating voltage across the windings due to continued inertial rotation of the tape transport after activation of both motors is terminated and braking initiated. The transport sensing means will sense a voltage across the windings as long as inertia keeps the tape moving. When the tape has substantially stopped, the voltage will approach zero and the sensing means can reactivate the tape transport in a different mode. Using such a sensing device eliminates the extra time inherently required in tape decks by reason of their delay circuitry and allows the system of the present invention to cycle or make its iterative steps in a closer time sequence, resulting in faster retrieval of the desired data.

Since the accessing system of the present invention is based upon approximate advancements of the tape, reading head 23 may start reading address signals in the middle of a 16 bit address. Accordingly, address verifying means connected to reading means and amplifier 24 and formed to prevent activation of tape transport until an address signal read by the reading means has been verified as being a complete address signal by receipt of exactly 16 data pulses should be included. The verifying means is further formed to cause the tape transport to operate at slow speed for reading until a complete address is read. Since the addresses are preferably recorded twice with two addresses per second, the address verifying means does not result in a significant delay in time by reason of its rejection of an address signal as being incomplete.

I claim:

1. In a data storage and retrieval apparatus including, a data storage medium formed with a multiplicity of storage areas each having an address signal recorded on said medium; reading and comparator means formed for storage of a target address therein and to read said address signals, and formed for comparison of said address signals with said target address and generation of an error signal proportional to the difference between the address signal read and said target address; and transport means connected to and mounting said reading and comparator means and said medium for relative sequential positioning of said reading and comparator means and said medium over said multiplicity of areas at a substantially reproducible pattern of movement for a given time interval, the improvement comprising:

a time interval generator means connected to said reading and comparator means for receipt of error signals therefrom and connected to said transport means for transmission of control signals thereto to control actuation of said transport means, said generator means being responsive to error signals falling within a first range of error signals of differing magnitude to generate first control signals starting said transport means and stopping the same after a first time interval, said generator means further being responsive to error signals falling outside said first range of error signals to generate additional control signals, said additional control signals starting said transport means and stopping the same after a time interval differing in length from said first time interval, and each said time interval defined by said control signals being precalibrated to be about equal in length to the length of time required to move the relative positions of said reading and comparator means and said medium through an incremental number of addresses equal to the magnitude of one of the error signals falling within the range of error signals to which each time interval corresponds.

2. In a data storage and retrieval apparatus as defined in claim 1 wherein said transport means is further formed for relative sequential positioning of said reading and comparator means and said medium at a slow speed for reading of address signals and at a fast speed for repositioning to the target address, the improvement wherein:

said generator means is formed to respond to an error signal generated by said reading and comparator means after reading at said slow speed by generating a control signal causing said transport means to sequentially reposition said reading and comparator means and said medium at said fast speed for a time interval precalibrated by reference to the pattern of travel of said transport in fast speed mode, said generator means further shifting said transport means to said slow speed after said precalibrated time interval for reading of a new address signal.

3. In a data storage and retrieval apparatus as defined in claim 2 wherein, said reading and comparator means and said generator means are formed to read an address signal at slow speed, generate an error signal, transport for a precalibrated time interval at fast speed, and read a new address signal and repeat the read-transport-read sequence until the current address signal read is equal to the target address; and wherein, said generator means is formed to cause said time intervals to be precalibrated to be equal in length to the length of time required to move at said fast speed the relative positions of said reading and comparator means and said medium through an incremental number of addresses about equal to the magnitude of the average error signal within said range of error signals.

4. In a data storage and retrieval apparatus as defined in claim 3 wherein, said reading and comparator means is formed to generate an error signal having a magnitude determined by the logarithm of the error between the address signal read and said target address; and wherein, said generator means is formed to be responsive to a plurality of ranges of error signals and to generate a control signal providing a precalibrated time interval for each range of error signals, each said range of error signals being defined by the integer part of the logarithm of the error.

5. In a data storage and retrieval apparatus as defined in claim 4 wherein, said error signal has a magnitude determined by the logarithm to the base 2 of the error.

6. In a data storage and retrieval apparatus as defined in claim 2, and decrementing means connected to said generator means and said reading and comparator means for transmission of signals therebetween, said decrementing means being formed for storage of a datum equal to an initial error, said initial error having a magnitude equal to the difference between the address signal read and said target address, said decrementing means being formed to reduce the magnitude of said datum sequentially down through a plurality of steps to zero at a constant rate of reduction, said decrementing means further being formed to actuate said transport means for movement at said fast rate of travel upon storage of said datum and to stop the movement of said transport means at said fast rate of travel upon reduction of said datum to zero.

7. In a data storage and retrieval apparatus as defined in claim 6 wherein, said decrementing means is formed to reduce the magnitude of said datum sequentially down through a plurality of steps to zero at a plurality of differing decrementing rates.

8. A method of reaching a given area having a known target address of a storage medium formed with a multiplicity of storage areas each having an address signal recorded on said medium from an initial area of said medium, comprising:

a. storing said target address in address comparator means;
b. reading an address signal with address reading means;
c. comparing said address signal to said target signal by said comparator means and generating an initial error signal with said comparator means;
d. sequentially repositioning the relative positions of said storage medium and said reading means at a substantially reproducible pattern of speed by transport means for a time interval selected from a plurality of precalibrated time intervals corresponding to a plurality of ranges of error signals stored in interval generator means, said selection being based upon the range of error signals in which said initial error signal falls and each of said precalibrated time intervals being about equal to the length of time required to transport the relative positions of said medium and reading means through an incremental number of addresses equal to the magnitude of one of the error signals falling within the range of error signals to which each time interval corresponds;
e. reading a new address signal with said reading means after repositioning, comparing said new address signal to said target address and generating a new error signal with said comparator means;
f. in the event that said new error signal is substantially different from zero, sequentially repositioning the relative positions of said storage medium and said reading means by said transport means for a time interval selected from said interval generator means based upon the magnitude of said new error signal; and
g. repeating steps (e) and (f) until the error signal is substantially zero.

9. The method of claim 8 wherein, said reading is accomplished by movement of said storage medium with respect to said reading means at a relatively slow rate of speed, and said repositioning is accomplished by movement of said storage medium with respect to said reading means at a relatively fast rate of speed.

10. The method as defined in claim 9, and selecting said time interval during which said repositioning occurs based upon the logarithm of the error signal generated by said comparator means, with the range of error signals corresponding to a given time interval being defined by the integer part of the logarithm of said error signal and the length of the time interval being precalibrated to be equal to the length of time required to sequentially move said medium past said reading means at said fast rate of speed through an incremental number of addresses about equal to the magnitude of the average error signal with the range of error signals defined by the integer part of the logarithm of the error signals.

11. The method as defined in claim 9, and storing a datum equal to said initial error signal in decrementing means;

decrementing said datum by reducing the magnitude of said datum sequentially through a plurality of steps to zero while said medium is sequentially moved past said reading means and terminating said repositioning upon decrementing of said datum to zero to vary said precalibrated time interval for greater precision in approximating the repositioning distance between the current and target addresses.

12. A control apparatus for use with a tape and tape recorder having a tape transport formed to advance said tape as mounted thereon at a slow speed for retrieval of data and at a high speed in forward and reverse directions for access to data, said recorder further including reading means for retrieval of data, said tape having a multiplicity of serially arranged storage areas thereon with address signals pre-recorded thereon in indexed relation to said areas for reading at slow speed, said control apparatus comprising:

a. comparator means formed for storage of a target address therein and connected to said reading means for receipt of address signals therefrom, said comparator means further being formed to compare address signals received from said reading means with said target address and to generate an error signal proportional to the difference between a current address signal read and a target signal and to generate a sign signal indicating the direction of the error therebetween, said comparator means further being connected to said tape transport for transmission of sign signals thereto to control the forward and reverse directions of said tape transport and formed to terminate searching for said target address when said error signal is substantially zero; and b. time interval generator means connected to said comparator means for receipt of error signals therefrom and connected to said tape transport for transmission of control signals thereto for actuation of said tape transport, said generator means being formed to actuate said tape transport in fast speed for a selected one of a plurality of precalibrated time intervals, said time intervals being selected by said generator means in response to the magnitude of error signals received from said comparator means and each of said plurality time intervals being selected by a plurality of error signals of differing magnitude forming a range of error signals with each time interval being matched to the speed characteristics of said tape transport to be equal to the length of time required for said tape transport to move said tape past said reading means at fast speed an incremental number of addresses about equal to the magnitude of average error in each range of error signals.

13. A control apparatus as defined in claim 12 wherein, said comparator means is formed to generate an error signal having a magnitude determined by the logarithm of the error between a read address and the target address; and wherein said generator means is formed with stored precalibrated time intervals with each said time interval being matched to a range of error signals defined by the integer part of the logarithm of the error.

14. A control apparatus as defined in claim 13 for use with a tape recorder in which said reading means retrieves data upon advancement of said tape at slow speed in a forward direction, wherein, said comparator means is formed to switch said tape into slow speed in a forward direction until said target address is reached upon receipt of an address signal which when compared to said target address yields an error signal substantially equal to zero and a sign signal indicating said target address is forward of the read address.

15. A control apparatus as defined in claim 14 wherein, said comparator means is connected to said generator means for transmission of said sign signals thereto, and said generator means is formed with a first set of precalibrated time intervals responsive to sign signals indicating an error in the forward direction and a second set of precalibrated time intervals of greater length than corresponding time intervals in said first set of time intervals responsive to sign signals indicating an error in the reverse direction.

16. A control apparatus as defined in claim 14 for use with a tape having address signals pre-recorded thereon in binary code wherein, said comparator means is formed to generate an error signal having a magnitude determined by the logarithm to the base 2 of said error, and said generator means is formed with each precalibrated time interval being selected by a range of error signals defined between an integer and the next adjacent integer of the logarithm to the base 2 of said error.

17. A control apparatus as defined in claim 13 and, decrementing means connected to said generator means and comparator means for transmission of signals therebetween, said decrementing means being formed for storage of a datum equal to the initial error, said decrementing means being formed to reduce the magnitude of said datum sequentially down through a plurality of steps to zero at a variable rate of reduction for each range of error signals, said decrementing means further being formed to actuate said transport means for movement at said fast speed upon storage of said datum and to stop the movement of said transport means at said fast speed upon reduction of said datum to zero.

18. A control apparatus as defined in claim 17 wherein, said comparator means includes an error register means formed for storage of a datum initially equal to the error between the current and target addresses, and an exponent extractor and an exponent storing register connected to said error register means and formed to extract the logarithm of said datum stored in said error register means and store the exponent of said datum in said exponent register; and wherein said decrementing means includes clock means formed to run at a predetermined count rate, a delay cycle counter connected to said clock means, delay cycle count termination matrix means formed to terminate counting by said delay cycle counter at a plurality of precalibrated count magnitudes, circuit means connecting said decrementing means to said comparator means for control of said tape transport through said comparator means, and selection means connected to said exponent register and said matrix means and formed to select a count termination magnitude from said matrix means based upon the magnitude of the integer part of said exponent and the sign of said error and connected to said error register for reduction of the value of said datum stored in said error register by one upon counting of said counter to a value equal to the selected count termination magnitude, said exponent extractor being formed to extract a new exponent from the reduced datum stored in said error register and said selection means selecting a count termination magnitude based upon said new exponent and reducing said reduced datum by one upon counting up to said count termination magnitude until said datum in said error register is reduced to zero by repeated extraction, selection, counting and reduction cycles, and said exponent register being formed to cause said tape transport to stop when said datum is reduced to zero.

19. A control apparatus as defined in claim 13 for use with an electric motor driven tape transport, and tape transport movement sensing means connected across the windings of the electric motor of said tape transport, said sensing means sensing the alternating voltage across said windings upon continued inertial rotation of said tape transport after activation of said motor is terminated, and said sensing means controlling reactivation of said tape transport until said alternating voltage is about zero and said tape is substantially motionless.

20. A control apparatus as defined in claim 13 and address verifying means connected to said reading means and said tape transport and formed to prevent activation of said tape transport in fast speed until an address signal read by said reading means has been verified as being a complete address signal and formed to cause said tape transport to operate at slow speed for reading until a complete address is read.

* * * * *